United States Patent [19]
Föhl

[11] Patent Number: 5,918,717
[45] Date of Patent: Jul. 6, 1999

[54] ROTARY DRIVE APPARATUS FOR A BELT TENSIONER

[76] Inventor: Artur Föhl, Auf der Halde 28, 73614 Schorndorf, Germany

[21] Appl. No.: 08/849,606

[22] PCT Filed: Sep. 27, 1996

[86] PCT No.: PCT/EP96/04235

§ 371 Date: Jun. 2, 1997

§ 102(e) Date: Jun. 2, 1997

[87] PCT Pub. No.: WO97/12786

PCT Pub. Date: Apr. 10, 1997

[51] Int. Cl.⁶ .............................. B60R 22/46; F16D 43/24
[52] U.S. Cl. ......................... 192/103 A; 192/71; 242/374
[58] Field of Search ......................... 192/103 C, 105 CF, 192/105 F, 103 B, 71; 242/374; 280/806; 297/478, 480

[56] References Cited

U.S. PATENT DOCUMENTS

| | | |
|---|---|---|
| 2,713,769 | 7/1955 | Johnson . |
| 4,455,000 | 6/1984 | Nilsson .................................. 242/374 |
| 5,351,485 | 10/1994 | Hiruta ................................. 242/374 X |
| 5,451,008 | 9/1995 | Hamaue .................................. 242/374 |
| 5,653,398 | 8/1997 | Fohl ......................................... 242/374 |
| 5,730,384 | 3/1998 | Fohl ......................................... 242/374 |
| 5,749,536 | 5/1998 | Specht et al. ........................... 242/374 |

FOREIGN PATENT DOCUMENTS

| | | |
|---|---|---|
| 0152395 | 8/1985 | European Pat. Off. . |
| 0648652 | 4/1995 | European Pat. Off. . |
| 2535380 | 2/1977 | Germany . |
| 9415157 | 11/1994 | Germany . |

*Primary Examiner*—Richard M. Lorence
*Attorney, Agent, or Firm*—Tarolli, Sundheim, Covell, Tummino & Szabo

[57] ABSTRACT

A rotary drive apparatus for a belt tensioner comprises a casing (10) in which a cylinder space (18) is formed, a generally circular disk-shaped rotor (14) mounted eccentrically therein having vanes (26) accommodated in radial slots (24) and a compressed gas source for pressurizing the chambers formed between the vanes, the rotor and the wall of the casing. The chambers are sealed off both with respect to each other and to the casing (10, 12) by a sealing system (30) on the rotor (14). The rotor (14) is mounted on said casing (10, 12) and is rotatable with respect to a shaft (16) and carries at least one pivotally mounted clutch pawl (32) which is engagingly positionable in a clutch toothing (34) on the circumference of said shaft (16).

10 Claims, 3 Drawing Sheets

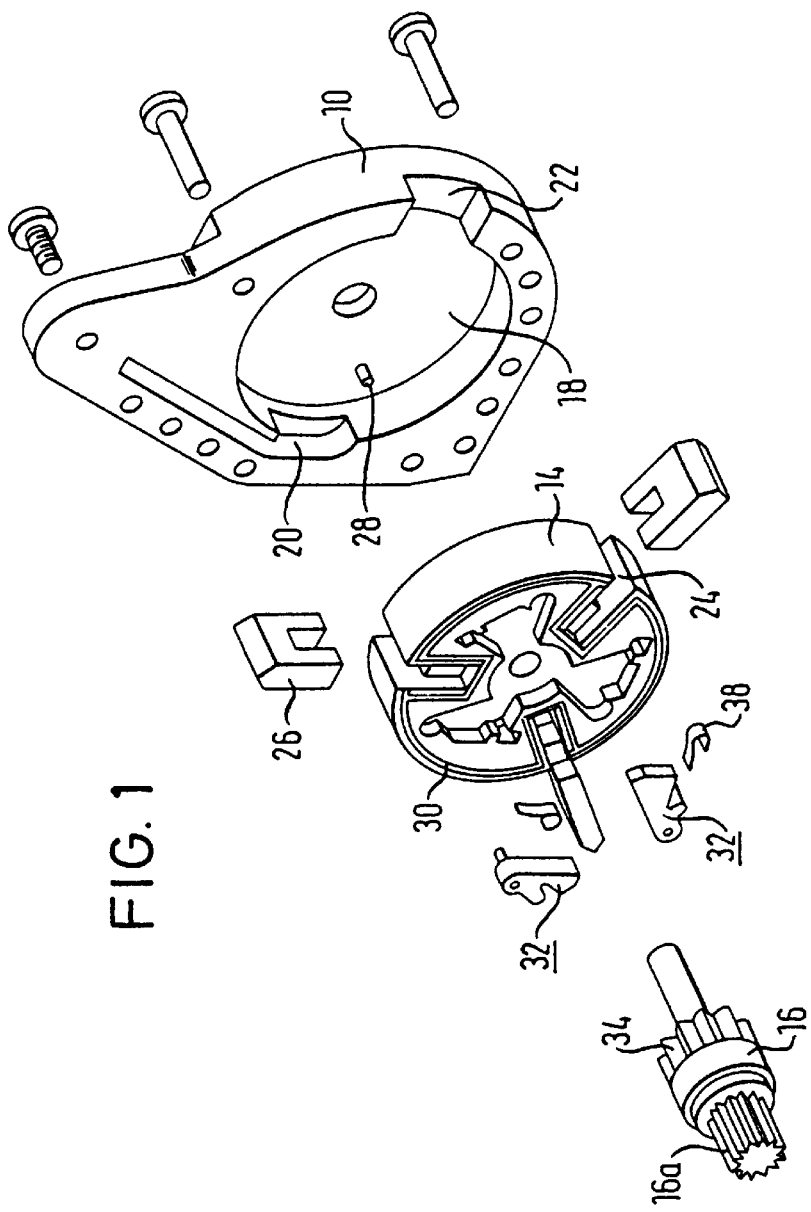
FIG. 1
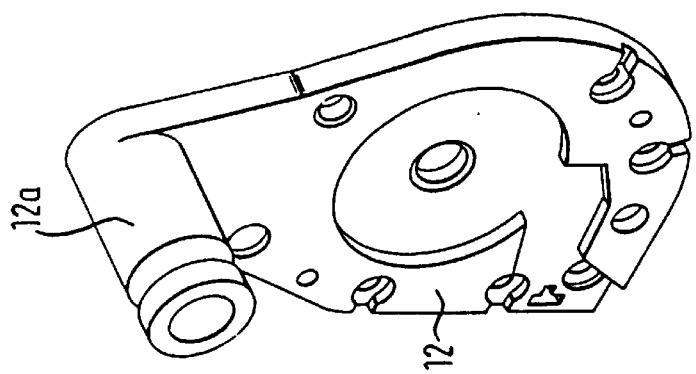

ROTARY DRIVE APPARATUS FOR A BELT TENSIONER

The invention relates to a rotary drive apparatus for a belt tensioner comprising a casing in which a cylinder space is formed, a generally circular disk-shaped rotor mounted eccentrically therein having vanes accommodated in radial slots and a compressed gas source for pressurizing the chambers formed between the vanes, the rotor and the wall of the casing.

A drive apparatus of this kind is already known from German patent 28 14 487. Since the rotor of this drive apparatus is directly coupled to the belt reel of a belt retractor, good utilization is made of the energy made available by the compressed gas source as compared to other types of belt tensioners in which a linear movement first needs to be translated into a rotary movement. The compressed gas source, a pyrotechnical inflator, pressurizes the cylinder spaces formed between the vanes of the rotor in this known drive apparatus, however, not directly but by means of a liquid working medium such as water, since it fails to adequately seal off the rotor in the casing without detrimenting smooth running of the belt reel in the belt retractor by the coupled rotor.

The invention provides for a rotary drive apparatus for a belt tensioner in which the chambers are directly pressurizable by the compressed gas from the compressed gas source and the rotor is not drivingly coupled to a shaft until the compressed gas source is activated, said shaft being coupled to the belt reel of the belt retractor so that the rotation of the belt reel is not obstructed in normal roll up and roll off operation.

In the case of the rotary drive apparatus according to the invention, the chambers are sealed off both with respect to each other and to the casing by a sealing system on the rotor, and the rotor is mounted on the casing and is rotatable with respect to a shaft and carries at least one pivotally mounted clutch pawl which is engagingly positionable in a clutch toothing on the circumference of the shaft. The sealing system ensures minor losses when the chambers are pressurized directly by the gases given off by the compressed gas source. The clutch pawl arranged between shaft and rotor permits decoupling of the rotor from the shaft in the normal resting position. Preferably, the clutch pawl is maintained out of engagement with the clutch toothing on the shaft by a spring in a resting position and is moved by the forces of inertia on acceleration of the rotor into engagement with the clutch toothing.

On completion of belt tensioning, the clutch pawl is moved back by the spring into the resting position in accordance with one preferred embodiment so that the rotor is again decoupled from the shaft. The belt reel of the belt retractor connected to the shaft is then again free to rotate as if the normal function of the belt retractor were reinstated. This function is important especially when the belt tensioner has been activated, e.g. in the case of a minor collision but leaving the car still capable of being driven so that it can be moved from the road or to a repair shop. In this case, the vehicle occupant is able to buckle up again after having removed the belt. Although the rotary drive apparatus can no longer be actuated, the belt retractor including its automatic blocking feature still works, however, as a belt retractor without a belt tensioner.

Due to the preferred arrangement of the clutch pawl in a recess in the face of the rotor between two adjacent vanes the coupling function is integrated in the rotary drive apparatus without magnifying its space requirement. In order that the clutch pawl, despite the compact configuration, is able to handle large forces, it is preferably crowned rounded at its end facing away from the tip of the pawl and supported by a correspondingly rounded surface of the recess.

Further features and advantages of the invention will be evident from the following description and the drawing to which reference is made, in which:

FIG. 1 is an exploded view of the rotary drive apparatus in accordance with a first embodiment;

Figure 2:
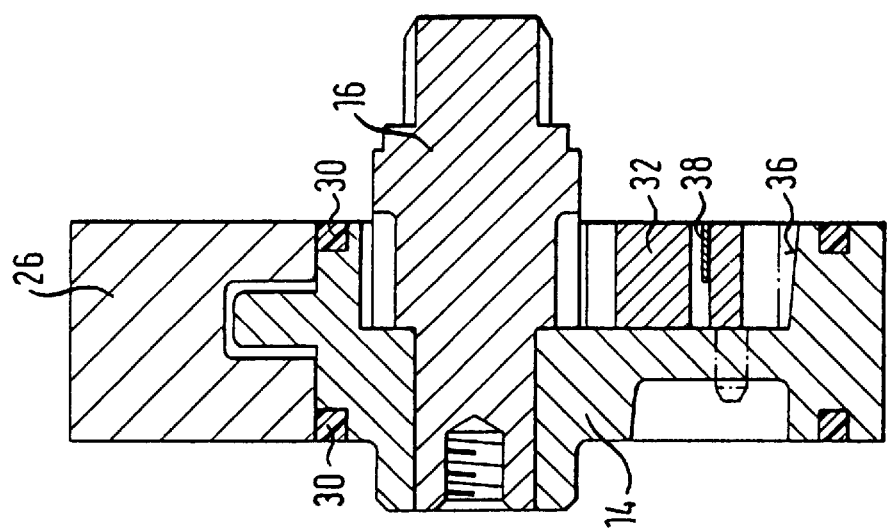
FIG. 2 is a side view of the rotor of the rotary drive apparatus of FIG. 1.

The main components of the rotary drive apparatus shown in FIG. 1 are a casing, comprising a casing bell 10 and a casing cover 12, a disk-shaped rotor 14 and a drive shaft 16 which is rotatively mounted in the rotor 14 and in a bore in the casing cover 12. The rotor 14 is rotatively mounted in a bore in the casing bell 10 and on the shaft 16. The shaft 16 has a serration 16a by means of which it is connected to the belt reel of a belt retractor (not shown).

The rotor 14 is accommodated in a cylinder space 18 defined by the casing bell 10. An inlet 20 is machined in the wall of the casing bell 10, through which the gases generated by a compressed gas source can be passed into the cylinder space 18. This compressed gas source is accommodated in a side boss 12a of the casing cover 12. Furthermore, recessed in the wall of the casing bell 10 roughly opposite the inlet 20 is an outlet 22.

The rotor 14 is provided with three radial slots 24 in each of which a vane 26 is shiftably accommodated. Each of these slots 24 is in connection by its radial inner end via a flow passage with the cylinder space 18. Between the rotor 14, the vanes 26 and the wall of the cylinder space 18 chambers, capable of being pressurized, are formed which are crescent-shaped as a whole due to the eccentric arrangement of the rotor 14 in the casing.

The vane 26 which closes off the chamber at the inlet end in the direction of rotation of the rotor 14 at its front end is fixedly located by a shear pin 28 at the casing bell 10 in an extended position in which its radial outer end sealingly engages the wall of the casing bell 10. As is best evident from FIG. 3, the sealing of the chambers with respect to each other and with respect to the casing is further achieved by a sealing system which substantially comprises a profile seal 30 inserted in each continuous groove in the faces of the rotor. This profile seal extends full-length along the outer circumference of the rotor 14 and radially inwards and again outwards about the vanes 26.

Since the rotor 14 is held non-rotatable at the casing by the shear pin 28 and the sealing system with the profile seal 30, a clutch is used to drivingly couple the rotor 14 to the shaft 16 upon activation of the compressed gas source.

This clutch comprises three clutch pawls 32 pivotally mounted on a face of the rotor 14 and a clutch toothing 34 provided on the circumference of the shaft 16. Each of the clutch pawls 32 is accommodated and supported in a recess 36 of one face of the rotor 14. The clutch pawls 32 each feature opposite their pawl tip a crowned rounded end 32*a* which is supported in a sliding manner at a correspondingly rounded surface of the recess 36. Each of the pawls 32 is pivotally mounted at the rotor 14 by a corresponding journal 32*b*. The pawls 32 are each held in the resting position by a leaf spring 38, the resting position being defined by contact with a surface of the recess 36. In this resting position, the center-of-gravity of each pawl 32, identified by S, is located radially inward relative to the journal 32*b* so that the forces of inertia act on the pawl with a lever arm and tend to swivel the pawl into engagement with the clutch toothing 34 when the rotor 14 is accelerated counter-clockwise. When the rotor 14 comes to rest on completion of belt tensioning, the pawls 32 are returned into the resting position by the assigned leaf springs 38. Each of these leaf springs is otherwise clamped in a U-shaped side recess of the rotor 14.

Figure 3:
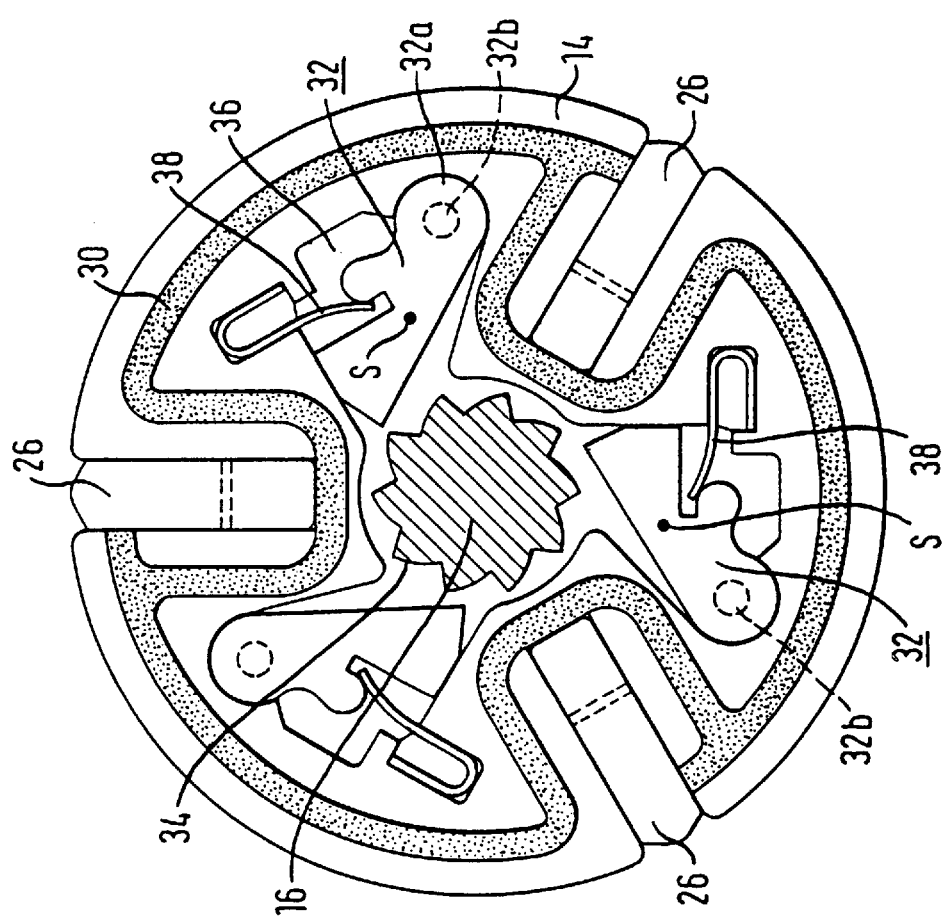
FIG. 3 is a side view of a face of the rotor shown in FIG. 2.

As evident from FIG. 3, the pawls 32 are slightly offset with respect to each other circumferentially, relative to the tips of the clutch toothing 34. Due to this offset it is assured that in accidental collision of two tooth tips one adjacent clutch pawl attains an optimum engaging position. Furthermore, the special shape of the clutch toothing 34 is evident, this comprising teeth have straight tooth flanks and curved tooth backs. The curved tooth backs facilitate return movement of the clutch pawls 32 into their resting position on relative movement between rotor 14 and shaft 16 contrary to the direction in which the rotor is turned for belt tensioning.

Finally, it is evident from FIG. 3 that the clutch between rotor 14 and shaft 16 could be integrated in the rotary drive apparatus without enlarging the size thereof, particularly in the axial direction.

An electric activation sensor (not shown) generates a signal in a restraint situation which, e.g. when a pyrotechnical inflator is provided, results in the pyrotechnical material being ignited. The gas flows via the inlet 20 into the casing and propels the rotor 14. The center-of-gravity of each clutch pawl 32 is so arranged relative to its axis of rotation that the forces of inertia on abrupt acceleration of the rotor 14 result in the clutch pawls 32 being pivoted inwards. After at least one clutch pawl 32 has mated with the clutch toothing 34, the shaft 16 and the belt retractor are caused to rotate. On completion of belt tensioning the leaf springs 38 urge the clutch pawls 32 back into their resting position so that the shaft 16 is freely rotatable.

Figure 4:
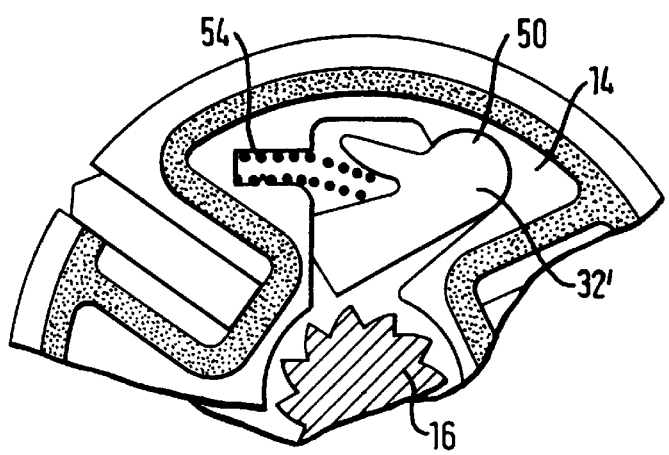
FIG. 4 is a side view of a second embodiment of the rotary drive apparatus according to the invention having, incorporated in the rotor, a clutch pawl which is urged by a helical spring into the resting position.
Figure 5:
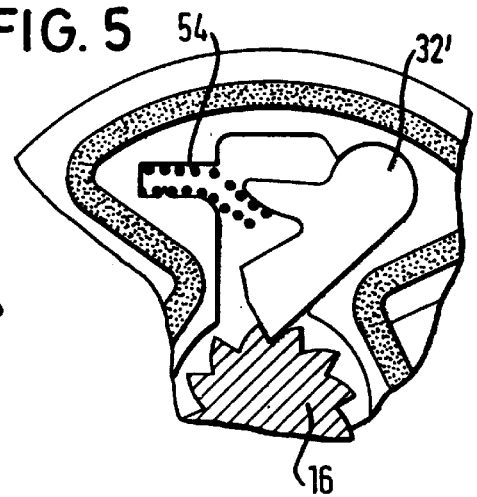
FIG. 5 shows the clutch pawl of FIG. 4 in the case of the rotary drive apparatus activated.
Figure 6:
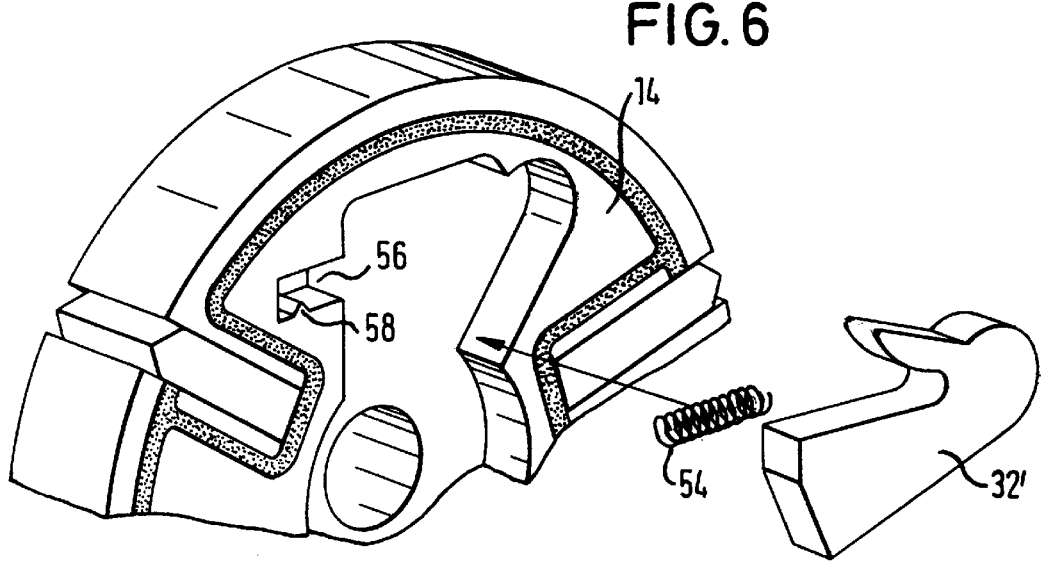
FIG. 6 is a perspective view of a part of the rotor indicated in the FIGS. 4 and 5.

The second embodiment of the rotary drive apparatus shown in the FIGS. 4 to 6 differs from that described before merely by the clutch pawl and the associated springs having a different configuration. In this embodiment, the clutch pawls 32' are not mounted by a journal 32*b* at the rotor 14, they instead feature an end 50 having a cylindrical outer contour which is pivotally mounted in a complementary shaped recess in the rotor 14. Each clutch pawl 32' is urged by a helical spring 54 into its resting position. The helical spring 54 is wound on block, preferably with pretensioning, and is urged into a side recess 56 (cf. FIG. 6) in the rotor 14. The recess 56 having a rectangular cross-section comprises a nose 58 protruding thereinto which serves to arrest the helical spring 54. The helical spring 54 is introduced sideways into the recess 56 as is indicated by an arrow in FIG. 6, the nose 58 thereby being shifted between two adjacent spring turns. The end of the helical spring 54 facing away from the clutch pawl 32' is, in addition, urged against the corresponding face defining the recess 56, as a result of which the helical spring 54 is already axially and radially fixedly located before placement of the casing cover 12.

By its periphery the helical spring 56 comes into contact with a protrusion of the clutch pawl 32' and is thereby slightly bent. On activation of the rotary drive apparatus, the helical spring 54 bends, as shown in FIG. 5, when the clutch pawl 32' swivels inwards. On completion of belt tensioning, the helical spring 54 urges the clutch pawl 32' back into its resting position shown in FIG. 4.

The embodiment shown in the FIGS. 4 to 6 permits automated assembly of the helical spring 54 without the need for complicated guiding aids. The spring dimensions in the case of this embodiment can be kept very small, helical springs having an outer diameter of 1.6 to 2 mm with a spring wire thickness of 0.3 mm having already proved to be suitable.

Figure 7:
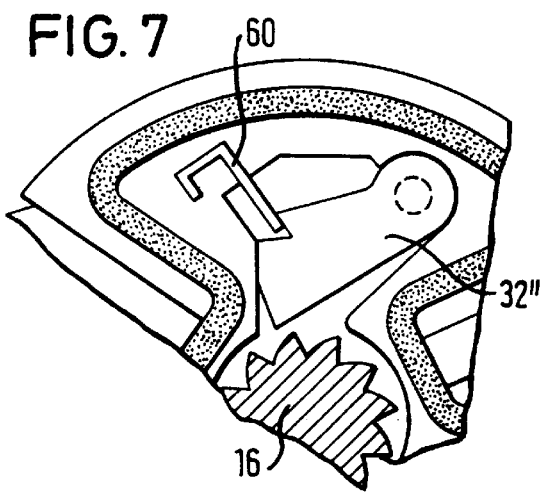
FIG. 7 is a side view of a third embodiment in the resting position.
Figure 8:
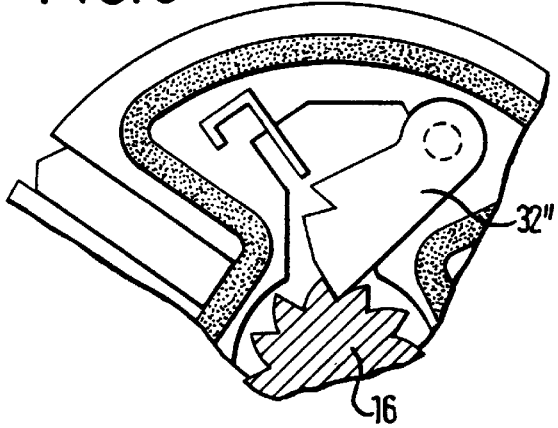
FIG. 8 is a side view of the third embodiment showing the pawl after belt tensioning has occurred.

The embodiment shown in FIG. 7 differs from that shown in FIG. 3 in that although the leaf springs 60 acting on the clutch pawls 32" urge the clutch pawls 32" into the resting position shown in FIG. 7, in which they do not engage into the clutch toothing 34, a free end of each leaf spring 60 engages a protrusion at the associated clutch pawl 32" such that, as shown in FIG. 8, the leaf spring 60 during belt tensioning disengages from the clutch pawl 32" and is then, for this reason, also no longer able to disengage clutch pawl 32" from the clutch toothing 34 following belt tensioning. As a result of this, the shaft 16 is prevented from rotating. The leaf spring 60 even prevents in the position shown in FIG. 8 any return swivelling of the clutch pawl 32" and acts as a locking mechanism. Although in this embodiment the normal function of the belt retractor is not reinstated following belt tensioning, the user is, however, alerted by the blocked tensioning shaft to the belt tensioner no longer being functionable, prompting him to seek workshop assistance.

I claim:

1. A rotary drive apparatus for a belt tensioner, comprising a casing in which a cylinder space is formed, a generally circular disk-shaped rotor mounted rotatably and eccentrically in said cylinder space and having vanes accommodated in radial slots of said rotor, and a compressed gas source for pressurizing chambers formed between said vanes, said rotor and said casing, said chambers being sealed off both with respect to each other and to said casing by a sealing system on said rotor, a shaft rotatably mounted in said casing and having a clutch toothing on a peripheral surface, and said rotor having at least one pivotally mounted clutch pawl for selective engagement in said clutch toothing of the shaft.

2. The rotary drive apparatus as set forth in claim 1, comprising a spring holding said pawl out of engagement with said clutch toothing on the shaft, said clutch pawl being adapted to be moved by inertial forces on acceleration of said rotor into engagement with said clutch toothing.

3. The rotary drive apparatus as set forth in claim 2, wherein said spring disengages said clutch pawl from said clutch toothing following belt tensioning to permit free rotation of said shaft.

4. The rotary drive apparatus as set forth in claim 3, wherein said spring is a leaf spring secured to said rotor by clamping.

5. The rotary drive apparatus as set forth in claim 3, wherein said spring is a flexed helical spring.

6. The rotary drive apparatus as set forth in claim 1, wherein said clutch pawl is mounted in a recess on one face of said rotor between two adjacent vanes and is supported at a wall portion of said recess.

7. The rotary drive apparatus as set forth in claim 6, wherein said clutch pawl is rounded at its end facing away from a tip portion of the pawl and supported by a correspondingly rounded surface portion of said recess.

8. The rotary drive apparatus as set forth in claim 1, comprising a plurality of clutch pawls of which at least two are offset with respect to each other in a circumferential direction of said rotor with respect to tooth tips of said clutch toothing on said shaft.

9. The rotary drive apparatus as set forth in claim 1, wherein said clutch toothing on said shaft has straight tooth flanks and curved tooth backs.

10. The rotary drive apparatus as set forth in claim 1, wherein at least one of said vanes is releasably locked to said casing by means of a shear pin.

* * * * *